United States Patent
Retzbach

(10) Patent No.: US 8,141,884 B2
(45) Date of Patent: Mar. 27, 2012

(54) CLAMPING DEVICE

(75) Inventor: Thomas Retzbach, Bonnigheim (DE)

(73) Assignee: Schunk GmbH & Co. KG Spann-und Greiftechnik, Lauffen (DE)

( * ) Notice: Subject to any disclaimer, the term of this patent is extended or adjusted under 35 U.S.C. 154(b) by 1291 days.

(21) Appl. No.: 11/792,950

(22) PCT Filed: Nov. 17, 2005

(86) PCT No.: PCT/EP2005/012314
§ 371 (c)(1),
(2), (4) Date: Jun. 13, 2007

(87) PCT Pub. No.: WO2006/063650
PCT Pub. Date: Jun. 22, 2006

(65) Prior Publication Data
US 2008/0001367 A1    Jan. 3, 2008

(30) Foreign Application Priority Data
Dec. 13, 2004    (EP) .................................... 04029675

(51) Int. Cl.
*B23B 31/14* (2006.01)
(52) U.S. Cl. ........................ 279/131; 279/43.1; 279/46.2
(58) Field of Classification Search ................ 279/43.1, 279/43.5, 46.2, 46.5, 46.8, 129–131; 192/105 CF; 408/143; 409/141; *B23B 31/14*
See application file for complete search history.

(56) References Cited

U.S. PATENT DOCUMENTS

| | | | |
|---|---|---|---|
| 3,230,833 A * | 1/1966 | Shurtliff | 409/141 |
| 3,438,660 A * | 4/1969 | Lajos | 403/357 |
| 6,443,462 B2 * | 9/2002 | Tempest | 279/131 |
| 6,470,553 B1 * | 10/2002 | Retzbach | 29/450 |
| 6,631,543 B2 * | 10/2003 | Retzbach | 29/450 |
| 6,929,431 B2 * | 8/2005 | Bergholt et al. | 408/143 |
| 7,101,108 B1 * | 9/2006 | Chuang | 403/227 |
| 7,217,072 B1 * | 5/2007 | Haimer | 409/234 |
| 7,547,168 B1 * | 6/2009 | Kosmowski | 409/231 |
| 2002/0105149 A1 * | 8/2002 | Karst | 279/131 |
| 2003/0147712 A1 * | 8/2003 | Kai et al. | 409/141 |
| 2009/0273145 A1 * | 11/2009 | Retzbach et al. | 279/28 |
| 2011/0200386 A1 * | 8/2011 | Kimman et al. | 403/373 |

FOREIGN PATENT DOCUMENTS
JP   2010099825 A * 5/2010
WO   WO 02/05992 A1 * 1/2002
* cited by examiner Primary Examiner — Eric A Gates
(74) Attorney, Agent, or Firm — Berenato & White, LLC

(57) ABSTRACT

The invention relates to a clamping device which comprises a base, having a center holding fixture for a structural component to be clamped and a plurality of cavities arranged around the holding fixture. The base can be elastically deformed in such a manner by radial compressive forces applied from the outside in the area of the cavities that a structural component to be clamped can be inserted in the holding fixture and can be elastically returned to its former shape by reducing or releasing the radial forces, thereby establishing a pressure connection with the structural component to be clamped. The invention is characterized in that centrifugal counterweights are provided inside the cavities.

15 Claims, 2 Drawing Sheets

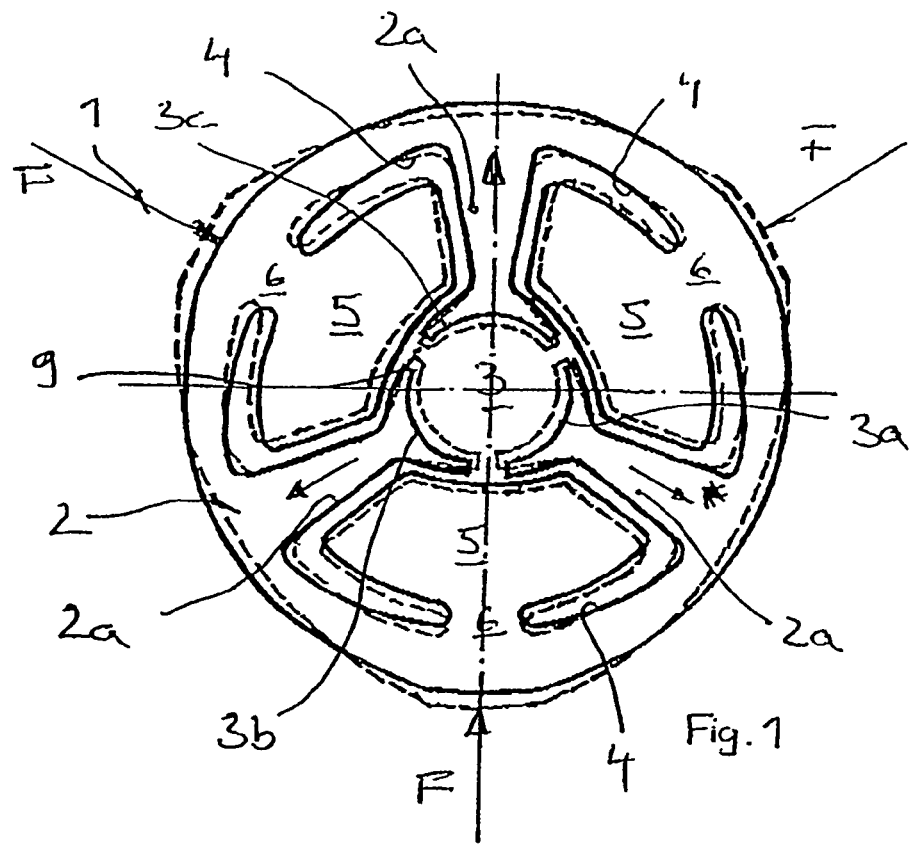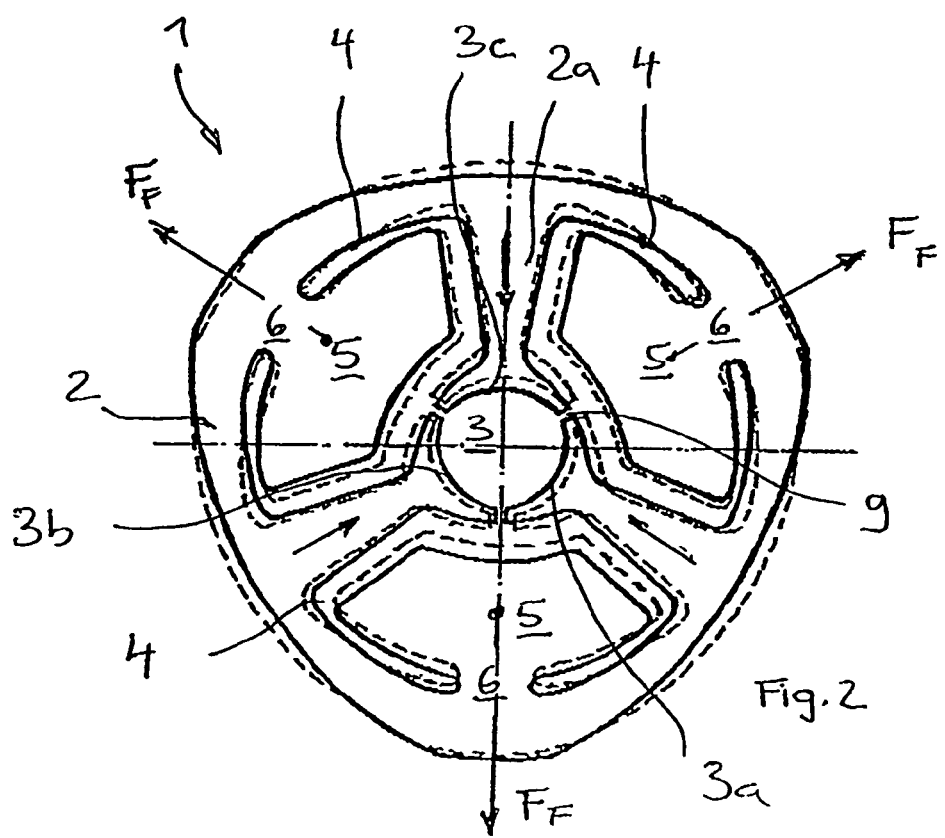

CLAMPING DEVICE

CROSS-REFERENCE TO RELATED APPLICATIONS AND CLAIM TO PRIORITY

Figure 3:
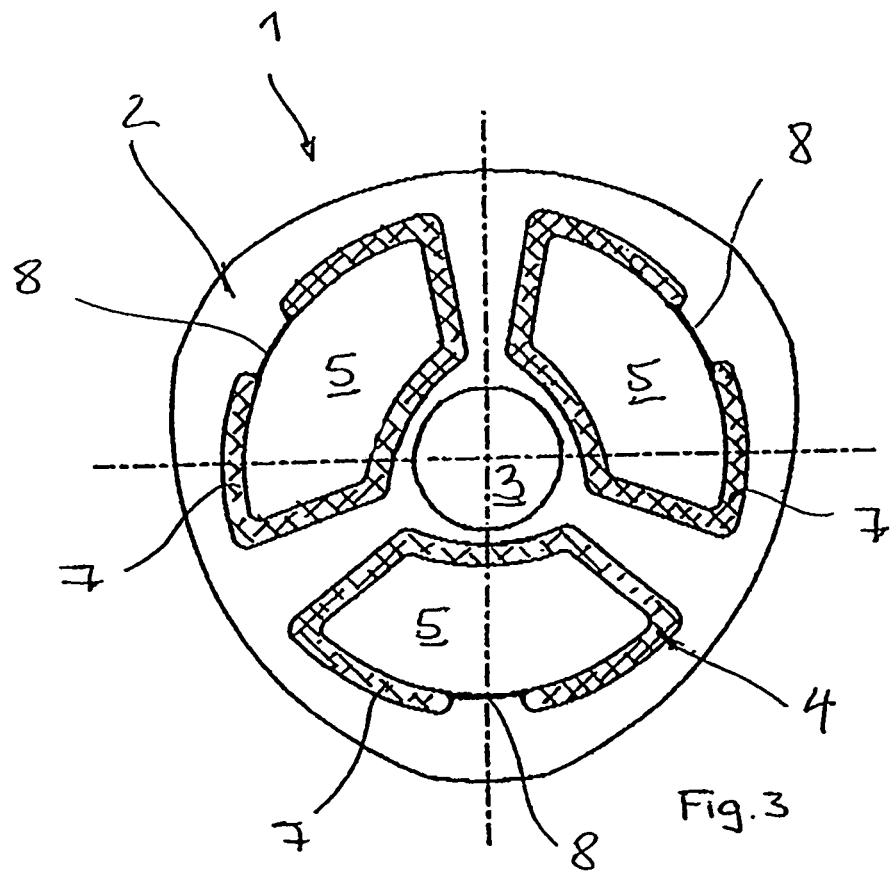

This application relates to International Application No. PCT/EP2005/012314 filed Nov. 17, 2005 and European Patent Application No. 04029675.8 filed Dec. 13, 2004, of which the disclosures are incorporated herein by reference and to which priority is claimed.

DESCRIPTION

The invention relates to a clamping device with a base element which has a central receptacle for a component to be clamped and several cavities around the receptacle, the base element being elastically deformable by radial compressive forces which are applied from the outside in the region of the cavities such that a component to be clamped can be pushed into the receptacle, and by reducing or releasing the radial compressive forces can be elastically deformed back in order to create a pressure connection with the component to be clamped.

Clamping devices of this type are known, for example, from DE 198 34 739 C1. With these clamping devices, the base element is polygonal in form and is brought elastically into a round shape by applying radial compressive forces. In so doing, the regions of the base element lying between the force application points are deformed such that the receptacle widens and a round shaft can be fitted. When the radial forces are then reduced or released, the deformed component springs back into its polygonal initial form so that the shaft is fixed in the recipient by means of a press fit.

With the known clamping devices, the cavities, which are advantageously positioned such that the effective lines of the radial compressive forces run centrally through them, guarantee that the base element, which is otherwise formed with thick walls, can be deformed with comparably low force expenditure, and has the deformation behaviour of a thin-walled component.

These types of clamping device have proven to be of value in practice. However, it has partially proven to be disadvantageous that with very high revolution speeds of well over 100,000 revolutions/min., under the influence of the effective centrifugal forces, the clamping device tends to open so that reliable clamping is no longer guaranteed.

Therefore, it is the objective of the invention to design a clamping device of the type specified at the start which guarantees reliable clamping, even at high revolution speeds.

This object is fulfilled according to the invention in that centrifugal force counterweights are provided in the cavities. If the clamping device according to the invention is set in rotation, the centrifugal force counterweights are pushed outwards due to the centrifugal forces that occur with the result that the regions lying between them are bent inwards, and so the receptacle closes. The clamping force is therefore obtained, or even strengthened, depending upon the size and weight of the centrifugal force counterweights. Tests have shown that with the clamping devices according to the invention, reliable clamping can be guaranteed with rotation speeds of up to 250,000 revolutions/min and more.

According to one embodiment of the invention, provision is made such that the centrifugal force counterweights are formed integrally with the base element and are connected in the region of the outer walls of the cavities to the base element by bar-like connection regions. In this case it is advantageous to dispose the bar-like connection regions between the base element in the region of the outer walls of the cavities and the centrifugal force counterweights approximately centrally in the cavities, as viewed in the circumferential direction, i.e. in the regions in which the radial compressive forces are also applied to the base element in order to open the receptacle.

Alternatively, it is possible to insert the centrifugal force counterweights into the cavities as separate components, the centrifugal force weights being designed and arranged such that bar-like force application regions are formed between the centrifugal force counterweights and the base element in which there is in particular direct contact between the base element and the centrifugal force counterweights. In this case too it is advantageous if the bar-like force application regions are positioned approximately centrally in the cavities, as viewed in the circumferential direction. In order to position the centrifugal force counterweights with this embodiment, it is advantageous to fill the regions of the cavities lying around the centrifugal force counterweights with an elastic material, such as plastic for example. This material can be poured into the cavities either after inserting the centrifugal force equalisation counterweights or be provided as pre-fabricated positioning aids. Filling with this type of elastic material can of course also be provided when the centrifugal force counterweights are securely connected to the base element.

Moreover, it is also possible to connect the centrifugal force counterweights formed as separate components in an appropriate way to the force application region with the base element.

Furthermore, the cavities can be designed, in a way known in its own right, to be open to the receptacle, and in particular be connected to the receptacle by radial cuts which are positioned centrally in the cavities, as viewed in the circumferential direction. In this case, separate clamping jaws are defined in the receptacle between the cuts.

According to an alternative embodiment of the invention, provision is made such that the cavities are filled at least partially with a bulk material and/or a liquid as centrifugal force counterweights. The centrifugal force counterweights can in this case be formed by a loose filling comprising grains of sand, steel balls or similar which are advantageously moistened with a lubricant such as a liquid, for example, so that they can slide more easily.

Figure 4:
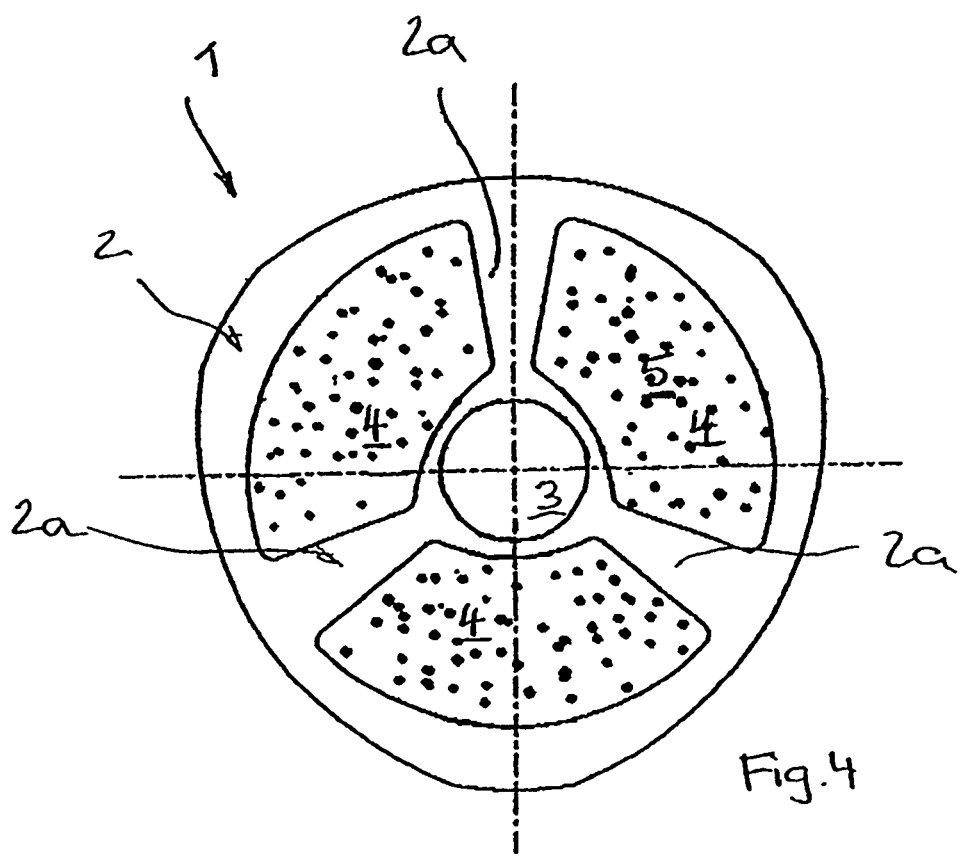

With regard to further advantageous embodiments of the invention, reference is made to the sub-claims and to the following description of examples of embodiments with reference to the attached drawings. The drawings show as follows:

FIG. 1 a first embodiment of a clamping device according to the invention in the joining and/or releasing state, FIG. 2 the clamping device from FIG. 1 in the non-activated clamping state, FIG. 3 a second embodiment of a clamping device according to the invention in the clamping state, and FIG. 4 a third embodiment of a clamping device according to the invention in the clamping state.

In FIGS. 1 and 2, an embodiment of a clamping device 1 according to the invention is shown which is designed, for example, as a chuck for clamping tools to the working spindle of a machine tool or, however, which can also be integrated directly into the working spindle of a machine tool. The clamping device 1 comprises a base element 2 with a polygonal outer contour in which a central receptacle 3 is formed for a component to be clamped. Around the receptacle 3, circle segment- or kidney-shaped cavities 4 are formed in the base element 2 which respectively extend over a circumferential region of approximately 100° and are made in the base element 2 by means of an electrical discharge machining or milling process, for example. Bars 2a therefore remain between the cavities 4 by means of which the wall regions lying outside of the cavities 4 are connected to the wall regions of the base element 2 lying within the cavities 4. FIGS. 1 and 2 also show that the cavities 4 are connected to the receptacle 3 by radial cuts 9 which are disposed approximately centrally in the cavities 4, as viewed in the circumferential direction. Between these radial cuts, three discrete clamping jaws 3a, 3b, 3c are formed in the receptacle 3 which are respectively connected by the bars 2a lying between the cavities 4 to the wall regions of the base element 2 lying radially outside of the cavities 4.

According to the invention, centrifugal force counterweights 5 are provided in the cavities. These centrifugal force counterweights 5 have a contour adapted to the shape of the cavities 4 and are formed integrally with the base element 2, being connected to the latter in the region of the outer walls of the cavities 4 by bar-like connection regions 6 which are positioned approximately centrally in the cavities 4 as viewed in the circumferential direction.

If a component, such as for example the shaft of a drill or of a milling tool, is to be clamped by the clamping device 1, as suggested by FIG. 1, radial compressive forces F are exerted upon the base element 2 from the outside, the force application points being chosen such that the effective lines of the forces F extend approximately centrally through the cavities 4. By means of the compressive forces F, the base element 2 is pressed radially inwards in the region of the force application points, and at the same time the regions lying between the application points, i.e. the bars 2a formed between the cavities 4 and with these the clamping jaws 3a, 3b, 3c, are elastically deformed outwards so that the receptacle 3 becomes larger and the component to be clamped can be pushed into the receptacle 3.

If the radial compressive forces F are now reduced or released, there is an elastic deformation back of the base element 2 with the result that the bars, and so the clamping jaws 3a, 3b, 3c, of the receptacle 3 move inwards again and press with the elastic restoring force against the shaft, by means of which a press fit is formed.

If during operation the clamping device 1 is rotated with a high rotation speed, the centrifugal force counterweights 5 are pushed outwards by the centrifugal forces $F_F$ that occur. These forces $F_F$ are applied to the rest of the base element 2 via the bar-like connection regions 6 so that said base element is pushed outwards in the connection regions 6. The regions lying between and so also the bars 2a lying between the cavities 4 and the clamping jaws 3a, 3b, 3c of the receptacle are bent inwards by means of which the clamping force can be obtained, or even further strengthened, even with high revolution speeds.

In FIG. 3, a modified embodiment of the clamping device 1 shown in FIGS. 1 and 2 and described above is shown. With this embodiment, the centrifugal force counterweights 5 are formed as separate components and inserted into the cavities 4. The centrifugal force counterweights 5 are formed in the same way here as with the clamping device 1 described above with reference to FIGS. 1 and 2, and make contact with the base element 2 in the region of the outer walls of the cavities 4 only via bar-like force application regions 8 which are positioned approximately centrally in the cavities 4, viewed in the circumferential direction. In order to securely position the centrifugal force counterweights 5 in the cavities, the spaces remaining in the cavities 4 around the centrifugal force counterweights 5 are filled with an elastic plastic material 7. This elastic plastic material 7 can be a pre-fabricated, for example injection-moulded, positioning element.

It is essential for there to be direct contact between the centrifugal force counterweights 5 and the base element 2 in the force application regions 8 if at all possible in order to guarantee direct application of force from the centrifugal force counterweights 5 into the base element 2.

It is also possible to fix the centrifugal force counterweights 5 in the force application regions 8 on the base element 2, for example by vulcanising them.

Finally, in FIG. 4 a third embodiment of the clamping device 1 according to the invention is shown with which the centrifugal force counterweights 5 are formed by a loose filling of grains of sand, steel balls or similar, which are moistened with a liquid so that they can slide more easily.

With the embodiments shown in FIGS. 3 and 4, the receptacle 3 is designed to be closed, i.e. unlike the clamping devices 1 shown in FIGS. 1 and 2, there is no connection between the receptacle 3 and the cavities 4.

The invention claimed is:

1. A clamping device with a base element (2) which has a central receptacle (3) for a component to be clamped and several cavities (4) around the receptacle (3), the base element (2) being elastically deformable by radial compressive forces (F) which are applied from the outside in the region of the cavities (3), such that a component to be clamped can be pushed into the receptacle (3) and by reducing or releasing the radial compressive forces can be elastically deformed back in order to create a pressure connection with the component to be clamped, wherein centrifugal force counterweights (5) are provided in the cavities (4), said centrifugal force counterweights (5) are formed integrally with the base element (2) and are connected in the region of the outer walls of the cavities (4) to the base element (2) by bar-like connection regions (6), wherein the bar-like connection regions (6, 8) between the base element (2) and the centrifugal force counterweights (5) are positioned approximately centrally in the cavities (4), as viewed in the circumferential direction.

2. The clamping device according to claim 1, wherein the cavities (4) are connected to and open to the receptacle (3).

3. The clamping device according to claim 2, wherein the cavities (4) are connected to the receptacle (3) by radial cuts (9) which are positioned centrally in the cavities (4) as viewed in the circumferential direction.

4. A clamping device with a base element (2) which has a central receptacle (3) for a component to be clamped and several cavities (4) around the receptacle (3), the base element (2) being elastically deformable by radial compressive forces (F) which are applied from the outside in the region of the cavities (3), such that a component to be clamped can be pushed into the receptacle (3) and by reducing or releasing the radial compressive forces can be elastically deformed back in order to create a pressure connection with the component to be clamped, wherein centrifugal force counterweights (5) are provided in the cavities (4), said centrifugal force counterweights (5) are formed integrally with the base element (2) and are connected in the region of the outer walls of the cavities (4) to the base element (2), and wherein centrifugal force counterweights (5) are inserted as separate components into the cavities (4) and are designed and arranged such that bar-like connections regions (8) are formed between the centrifugal force counterweights (5) and the base element (2) in the region of the outer walls of the cavities (4) in which there is in particular direct contact between the base element (2) and the centrifugal force counterweights, and wherein the bar-like connection regions (6, 8) between the base element (2) and the centrifugal force counterweights (5) are positioned approximately centrally in the cavities (4), as viewed in the circumferential direction.

5. A clamping device according to claim 4, wherein the regions of the cavities (4) lying around the centrifugal force counterweights (5) are filled with an elastic material.

6. The clamping device according to claim 4, wherein the cavities (4) are filled at least partially with a bulk material and/or a liquid as centrifugal force counterweights (5).

7. The clamping device according to claim 6, characterised in that the centrifugal force counterweights (5) are formed by a loose filling comprising grains of sand, steel balls or similar which are moistened with a lubricant, in particular a liquid.

8. A clamping device, comprising
a base element;
a central receptacle formed in said base element for component to be clamped;
a plurality of cavities symmetrically disposed around the receptacle, said cavities being formed in said base element;
centrifugal force counterweights disposed in the cavities;
bar-like connection regions connecting the centrifugal force counterweights to the base element in the region of radial outer walls of the cavities;
wherein the base element elastically deformable by radial compressive forces (F) which are applied from the outside in the region of the cavities, such that the receptacle becomes larger and the component to be clamped can be pushed into the receptacle and by reducing or releasing the radial compressive forces can be elastically deformed back in order to create a pressure connection with the component to be clamped.

9. A clamping device according to claim 8, wherein said centrifugal force counterweights is formed integrally with the base element.

10. A clamping device according to claim 8, wherein a majority of an outer peripheral surface of each said centrifugal force counterweights being circumscribed by respective spaces defined by said cavities.

11. A clamping device according to claim 8, wherein said cavities between said base element and said centrifugal force counterweights are filled with an elastic material.

12. A clamping device according to claim 8, wherein said bar-like connection regions being positioned approximately centrally in the cavities between the base element and the centrifugal force counterweights, as viewed in the circumferential direction.

13. A clamping device according to claim 8, wherein said bar-like connection regions define abutting surfaces between the base element and the centrifugal force counterweights.

14. The clamping device according to claim 8, wherein the cavities are connected to and open to the receptacle.

15. The clamping device according to claim 14, wherein the cavities are connected to the receptacle by radial cuts which are positioned centrally in the cavities as viewed in the circumferential direction.

* * * * *